United States Patent [19]

Walton

[11] 3,816,708

[45] June 11, 1974

[54] ELECTRONIC RECOGNITION AND IDENTIFICATION SYSTEM

[75] Inventor: Charles A. Walton, Los Gatos, Calif.

[73] Assignee: Proximity Devices, Inc., Sunnyvale, Calif.

[22] Filed: May 25, 1973

[21] Appl. No.: 363,851

[52] U.S. Cl. ..................... 235/61.11 H, 340/152 T

[51] Int. Cl. ..................... G06k 7/08

[58] Field of Search ................ 235/61.11 H, 61.7 B; 340/149 A, 152 T, 258 C; 343/6.5 SS, 6.8 R

[56] References Cited

UNITED STATES PATENTS

| | | | |
|---|---|---|---|
| 3,137,847 | 6/1964 | Kleist | 343/6.5 SS |
| 3,453,598 | 7/1969 | Schweizer | 340/149 A |
| 3,521,280 | 7/1970 | Janco et al. | 343/6.5 SS |
| 3,671,721 | 6/1972 | Hunn et al. | 340/258 C |
| 3,707,711 | 12/1972 | Cole et al. | 340/258 C |

FOREIGN PATENTS OR APPLICATIONS

| | | | |
|---|---|---|---|
| 1,206,925 | 9/1970 | Great Britain | 343/6.5 SS |

*Primary Examiner*—Daryl W. Cook
*Attorney, Agent, or Firm*—Schatzel & Hamrick

[57] ABSTRACT

An improved electronic recognition and identification system for recognizing and identifying the resonant frequency of a coded external passive network. The system comprises an active network including a radio frequency sweep oscillator driving a sensing coil to generate an external electromagnetic field for inductive coupling to the passive resonant network when said passive network is brought within the proximity of the sensing coil. The active network further includes a vector detector for detecting variations in the signal across said sensing coil due to said passive network and for generating detector signals representative of the resonant frequency of the passive network, an internal reference signal generating network for establishing select signals representative of a reference identification frequency, and a comparator network responsive to said detector and said select signals for generating control signals indicative of coincidence of non-coincidence of the detector and select signals, said logic comparator network having signal integrating capability to permit recognition of a sustained signal from the detector network and distinguish the sustained signal from random noise or other disturbances.

13 Claims, 9 Drawing Figures

ELECTRONIC RECOGNITION AND IDENTIFICATION SYSTEM

BACKGROUND OF THE INVENTION

1. Field of the Invention

The present invention relates to an electronic recognition and identification system for recognizing and identifying coded objects and more particularly to a system including an active electrical network adapted to respond to the proximity of coded electronic passive circuits.

2. Description of the Prior Art

Electronic recognition and identification systems presently exist for various functions including portal control in which case the system acts as a lock and key system. For example, an individual may carry an electronic coded identification card (key) for presentation to a reading station when the individual desires to enter the portal. If the card carries the proper code, responsive control signals are generated in turn permitting opening of the door. Other applications include object identification wherein the object carries an identification card. The card is coded to identify the object. As the card passes a reading station the code is read and responsive control signals generated. The control signals may then be utilized to control processing equipment and the destination of the object. For example, my present application entitled "Electronic Identification and Recognition System" filed Dec. 27, 1971, Ser. No. 212,281, now U.S. Pat. No. 3,752,960, describes an identification and recognition system.

With electronic recognition and identification systems it is desirable to provide a system which is capable of distinguishing coded signals from spurious and noise signals to improve the reliability of the system and to guard against false operation due to the spurious and noise signals. In practice it has been found that frequently spurious electrical noise bursts from extraneous sources occur thereby tending to give false operation of the system.

SUMMARY OF THE PRESENT INVENTION

The present invention provides for an improved recognition and identification system for portal control and recognizing and identifying coded objects or vehicles. The present system is adapted to distinguish coded signals from spurious and noise signals originating with extraneous sources to thereby avoid false operation of the system and erroneous identification.

The basic system includes a passive electronic circuit having a coded resonant identification frequency and an active network for sensing the code and generating responsive control signals. The coded passive circuit serves as an identification card to be carried by an individual or object to be recognized and identified. The active network includes a sensing coil positioned to permit electromagnetic coupling with the passive circuit when the identification card is placed in close physical proximity to the sensing coil. The sensing coil is excited by a radio frequency sweep oscillator source so as to generate an electromagnetic field within the proximity of the sensing coil. The field frequency repetitively sweeps through the range established by the oscillator. Due to mutual coupling the amplitude of the responsive signal across the sensing coil responds to the resonant frequency of the identification card such that when the field frequency matches the resonant frequency of the card a perturbation is produced in the responsive signal across the sensing coil. This perturbation may take the form of an amplitude and/or phase shift in the responsive signal. A detector is tied to the sensing coil and adapted to continuously detect the electrical condition of the sensing coil. The detector may be in the form of a resultant vector detector responsive to the amplitude and phase of the responsive signal. The detector in turn generates a condition digital signal responsive to the resonant frequency of the coded object. The detector extends to the input of a logic comparator network. The input of the logic comparator is further tied to an internal reference signal generator network adapted to generate reference digital signals responsive to a second passive circuit. The second passive circuit is readily changeable such that the reference frequency may be changed quickly and easily. The logic comparator network, in response to the condition signal and reference signal, generates control signals responsive to the recognition and identification of the coded passive circuit. The logic comparator includes an integrating capability to recognize a sustained condition signal and reference signal from the vector detector and internal reference network to distinguish the proper condition signal from noise or other disturbances.

Other embodiments and advantages will be in part evident to those skilled in the art and in part pointed out hereinafter in the following description taken in connection with the accompanying drawings wherein there is shown by way of illustration and not of limitation preferred embodiments of the invention.

DETAILED DESCRIPTION OF THE PREFERRED EMBODIMENT

Figure 1:
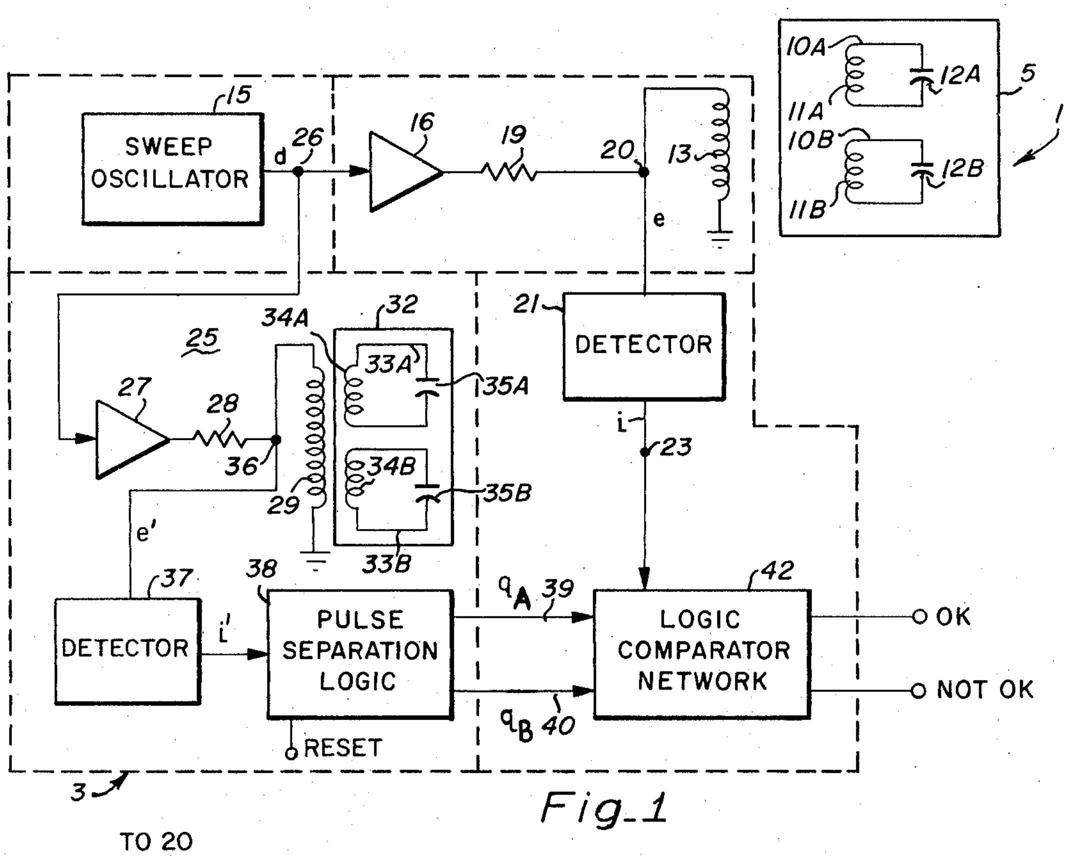
FIG. 1 is a block circuit diagram of an electronic identification and recognition system incorporating the present invention.

FIG. 1 diagrammatically illustrates in block diagram form an identification-recognition system referred to by the general reference character 1 and incorporating the teachings of the present invention. The system 1 includes an active electrical signal generation network 3 and a coded passive electrical network 5. The passive network 5 is in the form of an identification tag carrying two electrical passive inductance-capacitance circuits 10A and 10B. The passive network 5 may be in the form of a card to be carried by an individual or attached to an object to be recognized and identified. The passive circuit 10A includes an inductor 11A and a capacitor 12A electrically joined to form an electrical resonant circuit of a resonant frequency $f_a$. The passive circuit 10B carries an inductor 11B and a capacitor 12B joined to form an electrical resonant circuit of a resonant frequency $f_b$. In operation, the inductors 11A and 11B function as a secondary of a transformer for inductive coupling to a sensing coil 13 of the active network 3 when the coil 13 is excited and producing an electromagntic field within a sensing zone proximate to the coil. The values of the components of each of the passive circuits 10A and 10B may be selected such that each of the circuits has a select resonant identification frequency which individually or in combination serves as an identification or recognition code of the particular person or object carrying the card 5.

Sensing coil 13 functions as a primary coil and is excited with an alternating current stimulating signal originating from a radio frequency sweep oscillator 15. Sweep oscillator 15 is adapted to generate alternating current stimulating signals over a frequency range of $f_1$ to $f_{10}$ and to repeatedly sweep through said frequency range. The frequency range $f_1$ to $f_{10}$ includes the frequencies $f_a$ and $f_b$. The rate at which the oscillator 15 repeatedly sweeps through the frequency range $f_1$ to $f_{10}$ may be at an audio rate. The varying frequency stimulating signal from the sweep oscillator 15, represented by the symbol "*d*" (see FIG. 2) is fed to an isolation amplifier 16 which is joined in series with an impedance element 19 and the sense coil 13. Isolation amplifier 16 and impedance 19 are incorporated to provide a high output impedance and isolate the oscillator 15 from the effects influencing the coil 13 which may otherwise disturb the oscillator operation. The impedance 19 may take the form of a specific circuit element, such as a high value resistor, or may be the natural output impedance of the amplifier 16.

As the sweep oscillator 15 sweeps through the frequency range $f_1$ to $f_{10}$ and delivers the stimulating signal d to the coil 13, a varying frequency electromagnetic field is generated in the sensing zone proximate to the coil 13. As the passive electrical circuit 5 is moved within the sensing zone proximate to the sensing coil 13 and inductively coupled therewith, the electromagnetic field from the coil 13 will stimulate resonance responses in the circuits 10A and 10B. The load and resonance of the circuit 5 are reflected across the sensing coil 13 in the form of a reflected signal which mixes with the original stimulating signal. At the sweep frequencies of the signal *d* coinciding with the resonant frequencies $f_a$ and $f_b$ of the passive circuits 10A and 10B, the mixing causes perturbations in the potential across the sensing coil 13. These perturbations may be in the form of phase shifts and amplitude level changes at the resonant frequencies $f_a$ and $f_b$ as indicated by the responsive signal envelope waveform "*e*" of FIG. 2. These perturbations repeatedly occur as the signal *d* passes through the resonant frequencies and the passive circuit 5 is within the proximity of the coil 13.

Figure 2:
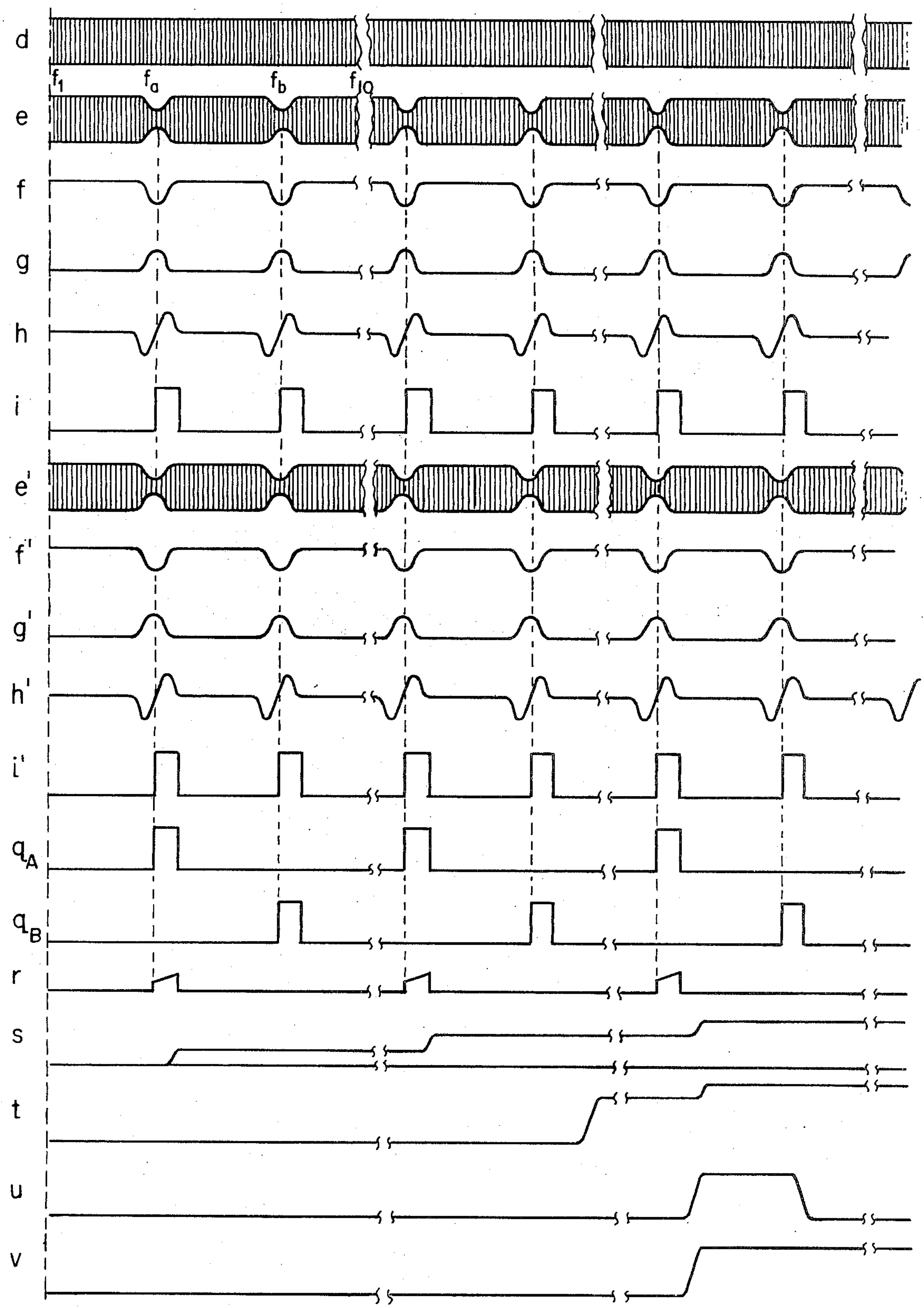
FIG. 2 is a graphical representation of the wave shapes of various signals encountered in the system of FIG. 1.

The envelope of the signal e thus functions as a primary signal carrying the information as to the identification of the passive network 5. To further process the signal *e* to capture the information contained therein, the signal may be sensed at a junction 20. The signal *e* at the junction 20 is fed to a vector detector stage 21. The detector stage 21 is adapted to respond to the positive and negative amplitude variations in the envelope of the responsive signal *e*. The positive variation in the signal *e* may be represented by the signal "*f*" and the negative variation by the signal "*g*," as illustrated in FIG. 2. The signals *f* and *g* may be viewed as the negative of one another and each takes a form approximating 1 cycle of a sine wave. The detector 21 in turn converts the train of signals *f* and *g* to a single train of enlarged signals "*h*" (see FIG. 2) and then to a train of condition digital pulses " *i*." The signal train *i* appears at an output terminal 23 of the detector stage 21. The timing of each signal *i* within its time period thus represents the frequency of the sweep signal *d* corresponding to the resonant frequencies of the circuits 10A and 10B of the passive network 5.

The sweep oscillator 15 is further connected to an internal reference signal generating network 25. The reference signal generator network 25 is joined to the oscillator 15 at a junction 26 to receive the sweep frequency stimulating signal *d*. The network 25 includes an isolation amplifier 27, an impedance 28 and a sensing coil 29 so as to generate an internal reference electro-magnetic field, within an internal sensing zone. A passive electrical network 32, which may be in a form analogous to the passive network 5, carries a pair of passive tuned circuits 33A and 33B respectively comprising an inductor 34A and 34B and a capacitor 35A and 35B. The values of the inductors 34A and 34B and capacitors 35A and 35B are selected such that the circuits 33A and 33B have select reference resonant frequencies $f_{a_1}$ and $f_{b_1}$. A reference radio frequency envelope, responsive to the resonant frequencies and proximity of the passive network 32 develops across the sensing coil 29 and may be taken at a junction 36. The signal envelope at the junction 36, represented by the signal *e'* of FIG. 2 takes a format similar to that of the signal *e* with the perturbations occuring at the resonant frequencies $f_{a_1}$ and $f_{b_1}$ of the circuits 33A and 33B. In operation, as the stimulating signal *d* passes through the resonant frequences of the internal passive circuits 33A and 33B, perturbations occur in the signal *e'* at the resonant frequencies $f_{a_1}$ and $f_{b_1}$. If the resonant frequencies $f_{a_1}$ and $f_{b_1}$ of the internal reference passive network 32 are the same as $f_a$ and $f_b$ of the external passive network 5, the perturbations in the signal e occur simultaneously with the perturbations in the signal *e'* and the response signal *e'* corresponds with the response signal *e*. The positive variation in the signal *e'* may be represented by the signal *f'* and the negative variation by the signal *g'* as illustrated in FIG. 2.

The output signal *e'* is received by a vector detector 37 within the internal reference signal generator network 25. The detector 37, which may be similar to the detector 21, strips away the radio frequency signals of the envelope *e'* and converts the signals *f'* and *g'* to an enlarged signal *h'*. The signal train *h'* is in turn converted to a primary reference condition signal train *i'*. The primary reference signal pulse train *i'* represents the times when the reference passive circuits 33A and 33B are resonant relative to the sweep signal *d*.

The output of the detector 37 is joined to the input of a pulse separation logic network 38. The pulse separation logic network 38 is adapted to separate alternate pulses of the pulse train $i'$ into two separate reference condition signal pulse trains $q_A$ and $q_B$ which respectively occur at alternate pulses of the pulse train $i'$ such that the timing of the pulse $q_A$ corresponds to the timing of $f_{a_1}$ and the timing of the pulse $q_B$ corresponds to the timing of $f_{b_1}$. Thus, the two pulses $q_A$ and $q_B$ each occur within one sweep of the signal $d$. The two separate reference condition pulse trains $q_A$ and $q_B$ from the network 38 respectfully appear on a pair of output lines 39 and 40.

A logic comparator network 42 is joined to the terminal 23 to receive the condition pulse signal train $i$ and to the lines 39 and 40 to receive the reference signal pulse trains $q_A$ and $q_B$. The logic comparator network 42 is adapted such that if there is time coincidence between the external condition pulse signal train $i$ and the internal reference signals $q_A$ and $q_B$ then an "OK" control signal is generated. If there is not time coincidence between the signal train $i$ and the reference signals $q_A$ and $q_B$, then the network 42 generates a "Not OK" control signal. The "OK" and "Not OK" control signals may be utilized to control external apparatus. The external apparatus may be in the form of a portal door in the event the system 1 is being used in a portal lock and key environment. In the event the system 1 is being used to identify objects, e.g., in a control processing environment, the "OK" and "Not OK" control signals may be used to control external processing equipment for further handling of the objects recognized and identified.

Figure 3:
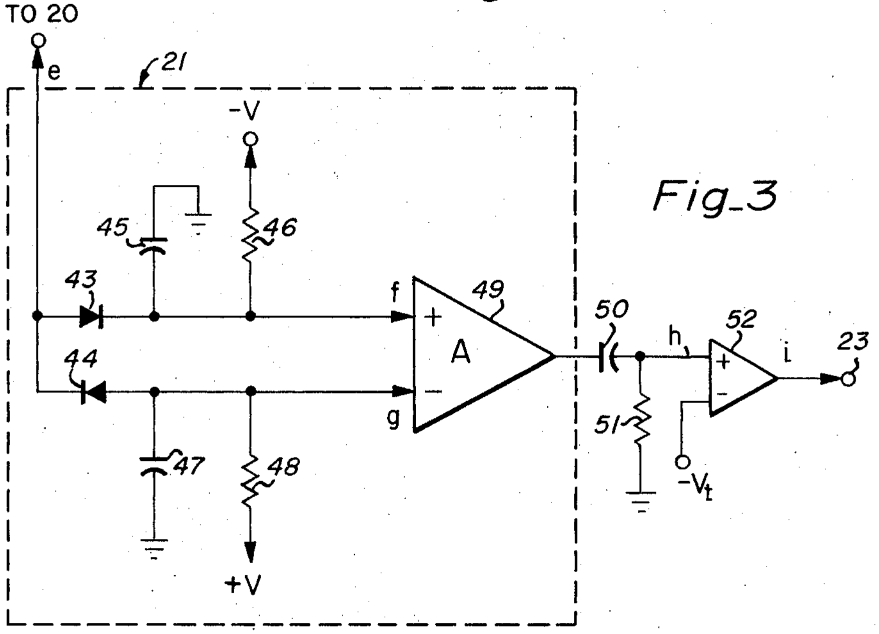
FIG. 3 is a circuit diagram illustrating a vector detector of the system of FIG. 1.

FIG. 3 illustrates a preferred embodiment of the vector detector 21 for converting the radio frequency response signal $e$ to the digital condition pulse signal train $i$. As illustrated in FIG. 2, the response signal $e$ presents a summation of the stimulating signal $d$ and the reflected signal due to the resonant frequency response of the external passive circuit 5. The envelope of the signal $e$ carries both positive and negative amplitude variations corresponding to the resonant frequencies $f_a$ and $f_b$. The vector detector 21 is a double sided detector and utilizes both the positive and negative amplitude variations in the envelope of the signal $e$ to generate the logic pulse signal train $i$ of which the time position of the pulses accurately reflect the resonant frequencies of the passive circuits 10A and 10B. Detector 21 includes a pair of unidirectional devices in the form of diodes 43 and 44. Diodes 43 and 44 are tied in parallel from the terminal 20 and of opposite polarity such that the signal $e$ is received at the anode of the diode 43 and at the cathode of diode 44. The cathode of the diode 43 is tied to a capacitor 45 extending to ground reference. Across the capacitor 45 is a resistance 46 which extends to a negative bias potential $-V$. The resistor 46 continuously discharges the capacitor 45. Thus, the radio frequency signals of the envelope $e$ are filtered or stripped and the potential at the cathode of the diode 43 responds to the positive side dip so as to produce the audio frequency signal $f$. The anode of the diode 44 is tied to a capacitor 47 which is also tied to ground reference. Across the capacitor 47 is a resistance 48 which extends to a positive bias potential $+V$. The resistor 48 continuously discharges the capacitor 47. Thus, the radio frequency signals of the envelope $e$ are filtered or stripped through the capacitor 47 and the potential at the anode of the diode 47 responds to the negative side dip of the envelope so as to produce the audio frequency $g$.

The audio frequency signals $g$ and $f$ are fed through a differential amplifier 49 for combining to generate an amplified responsive composite signal. The differential amplifier 49 subtracts the positive signal $g$ and negative signal $f$, thereby in effect adding the two signals and amplifying the resultant signal. The audio signal is then differentiated by a differentiator consisting of a capacitor 50 and a resistor 51. The differentiated signal then takes the form of the signal $h$ which is amplified by an amplifier 52 having a preset threshold level $V_t$. The amplifier 52 is adapted to respond to and amplify the positive portion of the differentiator signal above the threshold value and to amplify said signal by an amount to drive the amplifier 52 into saturation such that the overall resultant condition signal $i$ is digital in form. The condition signal $i$ then appears at the junction 23. The time relationship of the pulses of signal $i$ relative to the signal $d$ represents the frequency within the range $f_1$ to $f_{10}$ at which the passive circuits 10A and 10B were resonant. Thus, the signal $i$ is derived from amplitude variations in the signal $e$ and the phase of the signal $i$ relative to the signal $d$ represents the frequencies at which the passive network 5 is resonant.

Though it is possible to utilize a single sided detector, the use of a double sided detector as illustrated by the detector network 21 provides various advantages. For example, greater output and greater signal-to-noise ratio is realized over that of a one-sided detector. Also the double sided detector provides the rejection of low frequency common mode signals in the radio frequency signal and rejection of the radio frequency common mode signals. It further provides a more accurate identification of the point of resonance or point of inflection in the audio wave.

The vector detector 37 of the reference signal generator network 25 may be comprised of the same structure as that of the detector 21. The detector 37 receives the internal response signal $e'$ and converts it to the reference pulse train $i'$. The internal reference signal generator network 25 includes means for receiving the internal passive network 32 within the internal sensing zone proximate to the sensing coil 29 for electromagnetic coupling from a fixed distance. The passive network 32 is structurally and functionally similar to the passive network 5 and may be in the form of a card which can be readily replaced with a card carrying passive circuits of different resonant frequencies and/or combination of frequencies. In essence, the system may be conveniently "keyed" to a desired reference frequency merely by changing the passive network 32 to one of a desired combination of resonant frequencies. The detector 37 then receives the signal $e'$ and converts it to the digital train $i'$ in which the pulses occur at a time dependent on the resonant frequencies of the internal passive card 32.

Figure 4A:
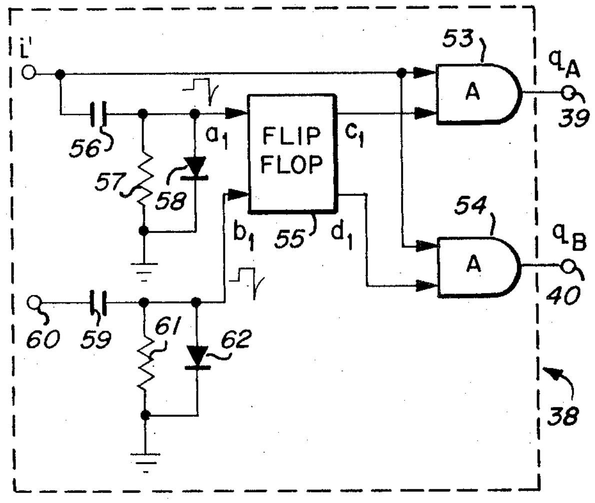
FIGS. 4A and 4B are respectively a circuit diagram of a pulse separation network and graphical representations of pulses of the circuit to explain its operation.
Figure 4B:
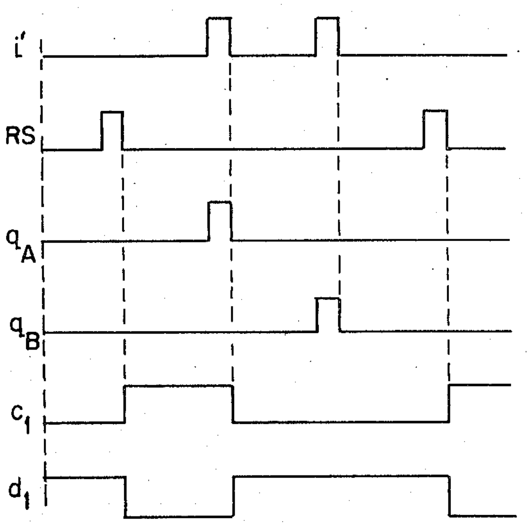

The internal reference signal $i'$ is fed to the pulse separation logic network 38 such that the two individual reference pulse signal trains $q_A$ and $q_B$ are generated and appear at the output lines 39 and 40. The reference signal trains $q_A$ and $q_B$ each occur between successive reset pulses with the time of occurence dependent upon the resonant frequency of the internal passive circuits 33A and 33B. An illustrated embodiment for the pulse separation network 38 is illustrated in FIG. 4A and waveforms for explaining the operation of the network are illustrated in FIG. 4B. The network 38 includes a pair of logic AND gates 53 and 54, the outputs of which are respectively common to the lines 39 and 40. One input terminal of each of the AND gates 53 and 54 is common to receive the reference pulse signal train $i'$. The other input terminal of the gates 53 and 54 are respectively common to individual output leads of a flip-flop logic gate 55. One input terminal of the flip-flop 55 is common to a capacitor 56 which extends to the input to receive the reference signal $i'$. A resistance 57 extends to ground reference level from the capacitor 56 and a diode 58 is in parallel with the diode. The other input terminal of the flip-flop 55 is common to a capacitor 59 which extends to a terminal 60 to receive a reset pulse. A resistance 61 extends to ground reference level from the capacitor 59 and a diode 62 is in parallel with the resistor 61.

In operation, the flip-flop 55 is actuated by pulling down the input signals $a_1$ or $b_1$ wherein $a_1$ emanates from the reference train $i'$ and $b_1$ from the reset pulse train. Also, the reference pulse train $i'$ is received at the input of the gates 53 and 54. Thus, each of the pulses of the pulse train $i'$ appear at the input of each of the gates 53 and 54. The reset pulses RS at the terminal 60 occur at each time the sweep oscillator 15 completes a sweep of the frequency range $f_1$ to $f_{10}$ and the oscillator is reset to repeat the sweep range. The flip-flop 55 is adapted to respond to the trailing edges of the pulses of signal $i'$ and the reset pulse train RS. Thus, responsive to the trailing edge of a reset input pulse $b_1$, as illustrated in FIG. 4, one side of the flip-flop 55 conducts thereby generating a signal $C_1$ to the AND gate 53. The flip-flop 55 continues to conduct and generate signal $C_1$ until the trailing edge of the first pulse $a_1$ of the train $i'$ is received at which time the flip-flop output level drops and the other side conducts thereby generating a signal $d_1$ to the AND gate 54. Thus, the AND gate 53 conducts during the time period at which the first pulse in the train $i'$ and the signal $C_1$ exists simultaneously thereby producing output signal $q_A$ at the terminal 39. Signal $d_1$ is produced when the other side of the flip-flop conducts. The AND gate 54 conducts during the time period at which the second pulse on the trail $i'$ and the signal $d_1$ simultaneously exist thereby producing the output signal $q_B$ at the terminal 40.

Figure 5:
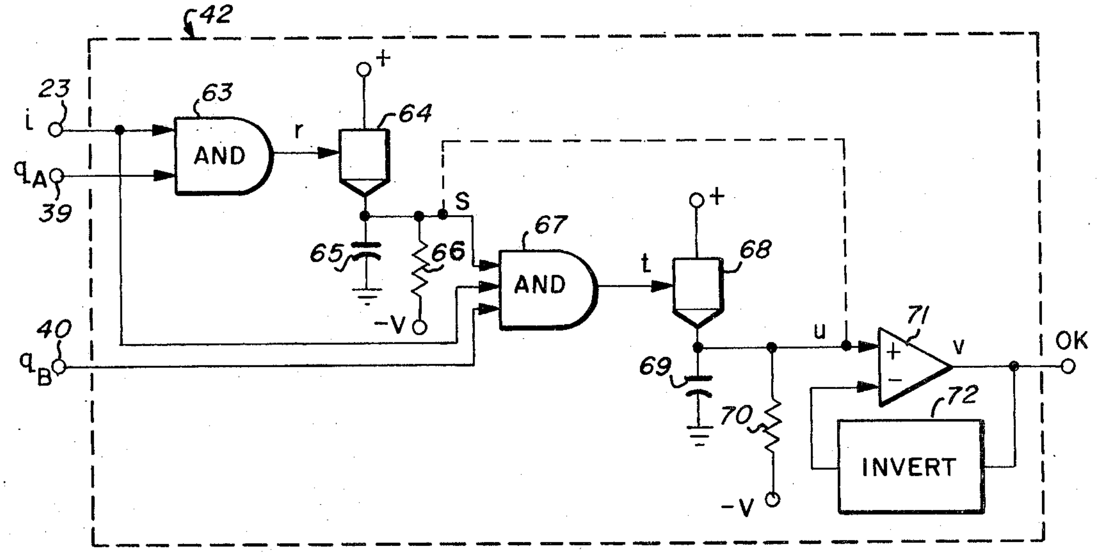
FIG. 5 is a compare logic network for the system of FIG. 1 and adapted to sense coincidence between condition signals and internally generated reference signals and to in turn generate responsive control signals.

FIG. 5 illustrates an embodiment of the logic comparator network 42. As previously indicated, the network 42 is adapted to perform the function of determining whether the resonant frequency of the external passive circuit 5 matches the resonant frequency of the internal passive circuit 25. This function is performed in spite of noise burst or spikes or other spurious signals. The comparator network 42 also establishes the amount of time for which the "OK" control signal is sustained after deciding whether coincidence exists. The network 42 receives the condition pulse signal $i$ and the reference pulse signals $q_A$ and $q_B$. The signals $i$ and $q_A$ are received by an AND logic gate 63. To the extent that the signals $i$ and $q_A$ coincide, there is a pulse signal $r$ (see FIG. 2) generated at the output of gate 63. The signal r is received at the base of a transistor 64. The signal $r$ in effect turns on the transistor 64 to allow current to flow into a capacitor 65. The capacitor 65 is also tied to ground reference. Across the capacitor 65 is a resistor 66 also tied to the $-V$ source. The component values of the capacitor 65, resistor 66 and peak values of the current through the transistor 64 are selected such that the capacitor 65 does not fully charge responsive to only one pulse of the signal $r$. Resistor 66 is large so that capacitor 65 discharges slowly after the pulse and the capacitor will have a large percent of its charge remaining at the end of each cycle. After a series of coincidences of the condition signals $i$ and reference signals $q_A$, typically five to ten, the capacitor 65 is sufficiently charged to constitute the presentation of a logic level signal "$s$" (see FIG. 2) to an AND gate 67. Also received by the AND gate 67 are the condition signals $i$ and the reference signals $q_B$. AND gate 67 is thus a three input gate in which the output responds only when there is time coincidence between the signals $i$ and $q_B$ and the signal S is at a sufficient logic level. When said conditions occur, the AND gate 67 generates an output signal "$t$" (see FIG. 2). Signal t is fed to the base of a transistor 68 and controls current flow through the transistor 68 into a capacitor 69. Across the capacitor 69 is a resistor 70 also tied to the $-V$ source. As with capacitor 65, the value of the capacitor 69 is selected such that only after repeated signals $t$, is the capacitor 69 charged to a level sufficient to present a logic signal "$u$." The logic signal $u$ (see FIG. 2) is applied to a repeater amplifier 71 set to produce an output control signal "$v$" (see FIG. 2) responsive to the level of the signal $u$ such that when the signal $u$ reaches the necessary level, the output control signal $v$ is generated. The $v$ signal represents an "OK" control signal, e.g., if the system 1 is being used for portal control the "OK" signal may be used to actuate a door latch to permit the door to be opened.

The control signal $v$ is also connected through an inverter 72 to the input of the repeater amplifier 71 so that the reference level for the repeater 71 is decreased thereby insuring that once a control signal is generated to the output control signal $v$ is sustained for an extended time period. Once the control signal $v$ is generated, it will be sustained after cessation of the signal $t$ due to the action of the inverter 72. When the signal $t$ ceases, the resistor 70 discharges the capacitor 69 at an exponential time rate dependent on the component values. The extent to which the capacitor 69 must be discharged before the $u$ signal falls to the reduced threshold is established by the action of the inverter 72. The reduced threshold and discharge rate of the capacitor 69 determines the time for which the $u$ signal persists after a successive set of coincidence of the external condition signal $i$ and the internal reference signals $q_A$ and $q_B$. Furthermore, the resistors 66 and 70 continuously discharge the capacitors 65 and 69 so that an occasional coincidence separated by a number of units of time or sweep cycles does not cause action nor will random noise cause an "OK" control signal action.

Figure 6A:
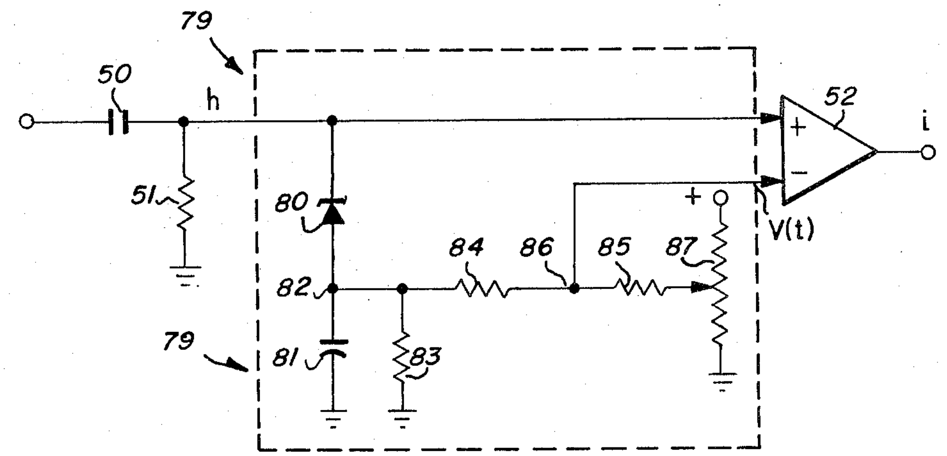
FIGS. 6A and 6B are respectively a circuit diagram illustrating an automatic sensitivity adjusting network for the system of FIG. 1 and a graphical representation of wave shapes of various signals for explanation of the operation of the network of FIG. 6A.

FIG. 6A illustrates an automatic sensitivity adjusting network referred to by the general reference character 79, which may be incorporated with the vector detector network 21 between the differentiator capacitor 50, resistor network 51 and the amplifier 52. The network 79 is adapted to suppress against the generation of condition signals responsive to harmonics of the audio signal $h$ and thereby further improve the sensitivity of the system. The problem of harmonics of the audio signal $h$ may arise due to the fact that the magnitude of the signal $h$ varies as the distance between the passive element 5 and sensing coil 13 varies. For example, as the distance between the passive element 5 and the sensing coil 13 decreases, the amplitude of the fundamental and harmonic perturbations in the envelope signal *e* increase. This in turn results in amplitude increases in the fundamental and harmonics of the signals *f*, *g* and *h*. To suppress against the generation of erroneous control signals, it is desirable to suppress the effects of the harmonics. At the same time, it is desirable to provide a system in which the actual distance between the passive element 5 and sensing coil 13 is not critical in order to generate a control signal. For example, various systems of the present invention have been constructed such that responsive control signals *i* are generated when the spacing is within the range of one-half inch to 3 inches.

The network 79 modifies the vector detector 21 to accomplish suppression of the second harmonic of the signal *h*. A zener diode 80 is tied at the junction of the capacitor 50 and resistor 51. The zener diode 80 and a capacitor 81 are tied in series at a common junction 82 and extend to ground reference from the junction of the capacitor 50 and resistor 51. A resistor 83 extends in parallel to the capacitor 81 from the junction 82 to the ground reference. A pair of resistors 84 and 85 are tied in series at a common junction 86 and extend from the junction 82. The resistor 85 is joined to the wiper arm of a variable resistor 87 of which one side is tied to the ground reference. The junction 86 is tied to the negative input terminal of the amplifier 52.

Figure 6B:
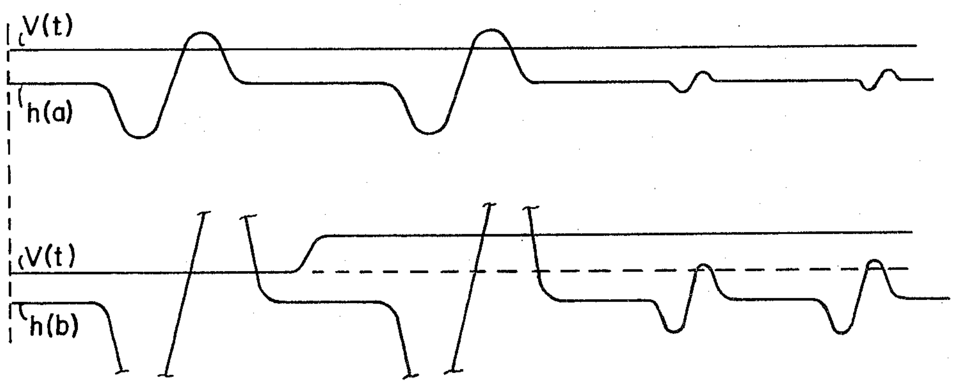

To further illustrate the operation of the harmonic suppressor, FIG. 6B illustrates the differentiated waveform *h* including the second harmonic, as it varies dependent on the relative spacing of the passive card 5 and sensing coil 13. For illustrative purposes, waveform *h*(*a*) of FIG. 6B depicts the audio signal h when the passive element 5 is approximately 3 inches from the sensing coil 13. Waveform *h*(*b*) illustrates the increase in amplitude of the signal h when the passive card 5 is approximately one-half inch from the sensing coil and illustrating that as the spacing decreases the amplitude increases. The amplifier 52 responds only to signals of an amplitude exceeding the threshold potential $V_t$ established on the negative input terminal. The threshold potential $V_t$ is dependent upon the signal *h* and establishes the response to both the fundamental and harmonic signals. The threshold potential $V_t$ is set according to the potential at the junction 86. The potential $V_t$ at the junction 86 is established according to the voltage dividing action of the resistors 84, 85 and 87. Thus, by adjusting the variable resistor 87, the threshold potential is varied.

In operation, during the positive half cycle of the signal *h*, the zener diode 80 conducts to permit charging of the capacitor 81 to a value dependent on the value of the signal *h*. Capacitor 81 in turn discharges. To suppress the harmonics, which become of greater concern as the spacing between the passive card 5 and sensing coil 13 decreases, the suppressor 79 is adapted to automatically sense the increase and adjust the threshold value $V_t$ upward such that $V_t$ is greater than the maximum amplitude of the harmonic signal of signal *h*. More explicitly, FIG. 6B illustrates the threshold value $V_t$ relative to the audio signal *h*(*a*) for a typical application when the card 5 is approximately 3 inches from the sensing coil 13. The value of the threshold $V_{(t)}$ is set to be greater than the peak of the harmonics. At said range, the peak of the fundamental exceeds the threshold value $V_t$ while the peak of the second harmonic is considerably less than $V_{(t)}$. Since the amplifier 52 only responds to signals exceeding $V_t$, as the card 5 approaches the coil 13 from a distance, the output is only initially responsive to the fundamental of the signal h as illustrated by the waveform *h*(*a*). As the passive element 5 is moved physically closer to the sensing coil, the peak values of both the fundamental and harmonic increases as illustrated by the waveform *h*(*b*). Failure to compensate for the increase in thr amplitude of the harmonics would result in the amplifier responding to the harmonics and generating erroneous signals. As the passive card 5 approaches closer to the sensing coil, the voltage dividing automatically senses the increase and adjusts the threshold value $V_{(t)}$. The adjusted threshold value $V_t$ is shown by solid line for when the audio signal *h*(*b*) increases. For relative comparison, the threshold $V_{(t)}$, for when the aduio signal *h*(*a*) is realized, is illustrated by broken line immediately below the solid line. Thus, as the increase in amplitude is automatically sensed, the threshold is automatically adjusted such that the peaks of the harmonics are less than $V_{(t)}$ and thus non-interfering.

Figure 7:
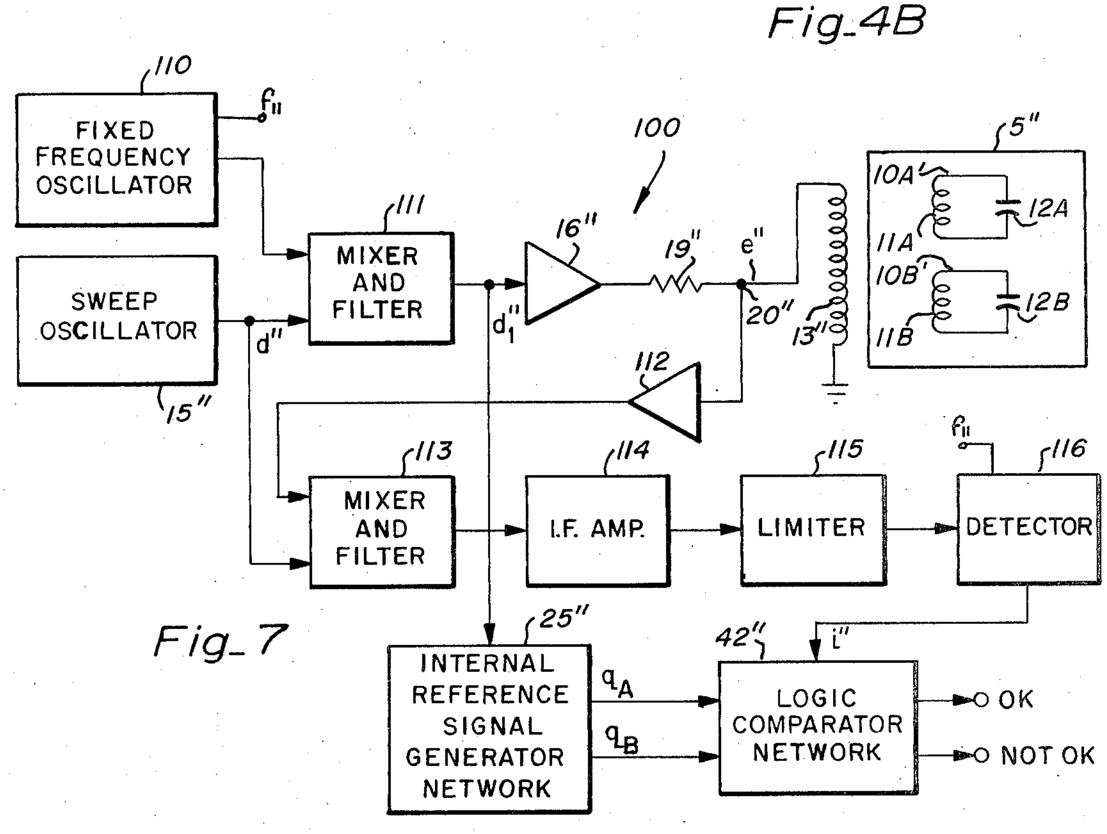
FIG. 7 illustrates an alternative embodiment of an identification and recognition system of the present invention and including an intermediate frequency amplifier.

FIG. 7 illustrates in block diagram form a further embodiment of the present identification and recognition system, referred to by the general reference character 100, and incorporating the teachings of the present invention. In the system 100 those components similar to that of FIG. 1 carry the same reference numeral designated by a double prime designation. The system 100 incorporates a local or fixed frequency oscillator 110 operative at a preset frequency $f_{11}$. The fixed frequency oscillator 110 and the sweep oscillator 15'' are both tied to the input of a mixer and filter network 111. The sweep oscillator 15'' generates the radio frequency signal *d''* which repeatedly sweeps through the frequency range $f_1$ to $f_{10}$, e.g., 12.7 mhz to 20.7 mhz. The outputs of the sweep oscillator 15'' and the oscillator 110 are mixed or heterodyned by the mixer and filter network 11 to produce a sweep output signal $d_1''$ within a frequency range $f_{12}$ to $f_{13}$ where $f_{12}$ equals ($f_1 - f_{11}$) and $f_{13}$ equals ($f_{10} - f_{11}$). With the fixed frequency $f_{11}$ being 10.7 mhz, $f_{12}$ becomes 2 mhz and $f_{13}$ becomes 10.0 mhz. The output $d_1''$ of the network 111 is then applied to the isolation amplifier 16'' which is tied in common to the impedance 19'' in series with the sensing coil 13'' stimulates the passive circuit 5'' and the response signal *e''* appears at the terminal 20''. The response signal *e''* is amplified by an amplifier 112 and fed to a mixer and filter network 113 which is also common to the sweep oscillator 15''. The response signal *e''* from the amplifier 112 and the stimulating signal *d''* are mixed and the unwanted harmonics and components are filtered out leaving a resultant signal of the frequency $f_{11}$ for all frequencies of the oscillator 15''. Thus, the subtraction and mixing effects occur for all frequencies of the sweep oscillator 15'' and the output of the mixer and filter network 113 is the same frequency as that of the mixed frequency oscillator 110. The timings of the envelope perturbations due to the passive circuit are dependent upon the resonent frequency of the passive circuit 5''. The signal $f_{11}$ from the mixer and filter network 113 is amplified by an intermediate frequency amplifier 114. The output of the amplifier 114 is fed to a limiter 115 which due to its limiting fuction aids in elimination of noise. At the same time the limiter 115 preserves the phase perturbations in the signal. The output of the limiter 115 is fed to an fm detector network 116 which converts and amplifies the signal to a digital condition signal train $i''$. The fm detector 116 may be of the phase detector type, in which the reference phase is attained from the fixed frequency oscillator 110, with frequency value $f_{11}$.

Generation of the internal reference signals $q_A$ and $q_B$ are accomplished the same as for the system 1, previously described and depicted. The signal $d_1''$ is received by the internal reference signal generator network 25'' which in turn generates the reference pulse trains $q_A$ and $q_B$. The condition signal train i'' and reference pulse trains $q_A$ and $q_B$ are received by the logic comparator network 42''.

While, for the sake of clearness and in order to disclose the invention so that the same can be readily understood, specific embodiments have been described and illustrated, it is to be understood that the present invention is not limited to the specific means disclosed. It may be embodied in other ways that will suggest themselves to persons skilled in the art. It is believed that this invention is new and all such changes as come within the scope of the following claims are to be considered as part of the invention.

What is claimed is:

1. An improved electronic recognition and identification system for identifying electrically coded passive objects and generating control signals responsive to the code of the passive objects, the system comprising a coded external passive electrical identification object including a passive electrical circuit, said passive circuit having a coded resonant frequency and adapted to be brought within an external sensing zone;

an active electrical signal generation network including a first sensing coil, a radio frequency signal source means adapted to provide stimulating electrical signals repeatedly sweeping through a range of radio frequencies, said frequency range including said coded resonant frequency of the passive electrical object, said radio frequency signal source means being joined to said sensing coil to permit said first sensing coil to produce electromagnetic field signals within said external sensing zone for inductive coupling with the external passive object when said object is within said external sensing zone, a first detector means engaged to said sensing coil for detecting perturbations in the envelope of the signal across said first sensing coil as the frequency of said electromagnetic field in said external sensing zone approaches said coded resonant frequency of the external passive object, said first detector means being adapted to produce condition signals responsive to the timing of said perturbations of the envelope of frequency signals across said first sensing coil;

an internal reference signal generator means engaged to said radio frequency signal source means, said internal reference signal generator means including an internal passive circuit means having a select reference resonant frequency which reference resonant frequency is within the range of said radio frequency source means, second detector means for detecting coincidence of said resonant frequency of said internal passive object and the radio frequency signal source, said second detector means being adapted to produce internal reference signals responsive to the timing at which the frequency of said radio frequency signal source coincides with the resonant frequency of said internal passive circuit means; and logic comparator means having input terminal means for receiving said condition signals and said internal reference signals, the logic comparator means being adapted to generate control signals responsive to time coincidence of the condition signals and internal reference signals.

2. The electronic recognition and identification system of claim 1 in which the internal reference signal generator includes a second sensing coil joined to said radio frequency generating source means to permit said second coil to produce electromagnetic field signals within an internal sensing zone, a reference coded passive electrical object having a reference coded resonant frequency and adapted to be positioned within said internal sensing zone for inductive coupling to said second sensing coil, a second detector means engaged to said second sensing coil for detecting perturbations in the envelope of the signal across said second sensing coil as the frequency of said electromatic field in said internal sensing zone approaches said coded resonant frequency of the reference coded passive electrical object, said second detector means being adapted to produce reference signals responsive to the timing of said perturbations of the envelope of radio frequency signals across said second sensing coil.

3. The electronic recognition and identification system of claim 2 in which said first detector includes stripping means for stripping the radio frequency signals of the envelope of said signal across said first sensing coil and separating said perturbations from said envelope and providing condition digital pulse signals responsive to said perturbations;

said second detector includes stripping means for stripping the radio frequency signals of the envelope of said signal across said second sensing coil and separating said perturbations from said envelope and providing an internal reference digital pulse signal train responsive to said perturbations in the envelope of the signal across said second sensing coil; and in which the comparator means includes a logic comparator network responsive to said condition digital pulse signals and said reference digital pulse signal train.

4. The electronic recognition and identification system of claim 3 in which the internal reference signal generator further includes a pulse separation logic means for receiving said primary reference digital pulse signal train and separating alternate pulses of said reference signal train to separate internal reference trains, the number of individual separate internal reference trains coinciding with the number of internal reference passive circuits within said internal reference signal generator means.

5. The electronic recognition and identification system of claim 4 in which the comparator means includes a logic comparator network responsive to the condition digital pulse signal train and each of said separate reference trains, said comparator network being adapted to generate a first output control signal only when timing coincidence exist between a first separate internal reference train and the condition digital pulse signal train and timing coincidence exist between a second separate internal reference train and the condition digital pulse signal.

6. The electronic recognition and identification system of claim 5 in which said logic comparator network includes a first AND gate responsive to said condition digital pulse signals and said first separate internal reference train, a first storage means engaged to the output of said first AND gate for developing a first charge potential responsive to repetitive coincidence of said condition digital pulse signal train and said first separate internal reference train, a second AND gate responsive to said first charge potential, said condition digital pulse signal and said second separate internal reference train, the output of said second AND gate being dependent on the magnitude of said charge potential and the coincidence of said second separate internal reference train and the condition digital pulse signal train.

7. The electronic recognition and identification system of claim 6 in which the first detector means includes a first unidirectional conductive element responsive to the positive portions of the envelope across said first sensing coil and generating a first signal train responsive to perturbations in the positive portion of said envelope, a second unidirectional conductive element responsive to the negative portions of the envelope across said first sensing coil and generating a second signal train responsive to perturbations in the negative portion of said envelope, and a differential amplifier means for combining said first and second signal trains to a composite signal train.

8. The electronic recognition and identification system of claim 7 in which the first detector further includes a differentiator network for differentiating said composite signal train and producing said condition signals, and an amplifier stage having a preset threshold level, said amplifier stage receiving said differentiated composite signal train and amplifying those signals of a magnitude greater than the threshold level.

9. The electronic recognition and identification system of claim 8 wherein said logic comparator network further includes a second storage means engaged to the output of said second AND gate for developing a second charge potential responsive to repetitive output signals of said second AND gate.

10. The electronic recognition and identification system of claim 9 wherein said logic comparator network further includes an operational amplifier engaged to said second storage means, and an inverter engaged across the output and input of said operational amplifier to vary the threshold level of said operational amplifier responsive to the output of said amplifier.

11. The electronic recognition and identification system of claim 7 wherein said first detector means further includes an automatic sensitivity network to suppress harmonics of said composite signal train, said automatic sensitivity network including threshold level signal control means for controling the threshold level of said amplifier stage to a magnitude exceeding the peak magnitude of the unwanted harmonic signals of the composite differentiated signal train.

12. The electronic recognition and identification system of claim 11 wherein said automatic sensitivity network includes a storage charge capacitor tied in series with a unidirectional conductive device extending to the differentiator network whereby the charge on said capacitor is dependent on the magnitude of said differentiated signal, and a voltage divider network across said capacitor and joined to said amplifier stage at a threshold level terminal of said amplifier.

13. The electronic recognition and identification system of claim 3 in which the signal source means of the active electrical signal generation network includes a fixed frequency oscillator means, a sweep oscillator means, a first mixer network engaged to said fixed frequency oscillator and said sweep oscillator means, said first mixer being adapted to the stimulating electrical signal within a frequency range dependent on the difference between the sweep frequency and fixed frequency;

said first detector means including a second mixer network joined to said sensing coil and said sweep oscillator to generate an envelope of a frequency corresponding to the frequency of said fixed frequency oscillator and adapted to produce condition signals responsive to the timing of said perturbations of the envelope of the output signal of the second mixer network.

* * * * *